(12) United States Patent
Kim et al.

(10) Patent No.: US 10,330,351 B2
(45) Date of Patent: Jun. 25, 2019

(54) REFRIGERATOR

(71) Applicant: LG Electronics Inc., Seoul (KR)

(72) Inventors: Kyeongyun Kim, Seoul (KR); Sunam Chae, Seoul (KR); Kyungseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/545,576

(22) PCT Filed: Jan. 21, 2016

(86) PCT No.: PCT/KR2016/000638
§ 371 (c)(1),
(2) Date: Jul. 21, 2017

(87) PCT Pub. No.: WO2016/117935
PCT Pub. Date: Jul. 28, 2016

(65) Prior Publication Data
US 2018/0010825 A1    Jan. 11, 2018

(30) Foreign Application Priority Data
Jan. 23, 2015    (KR) .................. 10-2015-0011346

(51) Int. Cl.
*F25B 7/00*    (2006.01)
*F25B 5/00*    (2006.01)
(Continued)

(52) U.S. Cl.
CPC ............. *F25B 5/00* (2013.01); *F25B 6/00* (2013.01); *F25B 6/04* (2013.01); *F25B 7/00* (2013.01);
(Continued)

(58) Field of Classification Search
CPC ...... F25B 5/00; F25B 6/00; F25B 6/04; F25B 7/00; F25B 49/02; F25B 49/022; F25B 2600/112; Y02B 30/743
See application file for complete search history.

(56) References Cited

U.S. PATENT DOCUMENTS 4,598,556 A * 7/1986 Mokadam ................. F25B 1/10
62/117
5,235,820 A * 8/1993 Radermacher ............ F25B 1/10
62/114
(Continued)

FOREIGN PATENT DOCUMENTS

EP          2511627       10/2012
WO       2014045612        3/2014

OTHER PUBLICATIONS

International Search Report and Written Opinion in International Application No. PCT/KR2016/000638, dated Apr. 1, 2016, 9 pages (with English translation).

*Primary Examiner* — Melvin Jones
(74) *Attorney, Agent, or Firm* — Fish & Richardson P.C.

(57) ABSTRACT

A refrigerator includes a first compressor configured to compress first refrigerant, a first condenser configured to condense the compressed first refrigerant, a first expansion valve configured to reduce a temperature and a pressure of the condensed first refrigerant, a first evaporator configured to evaporate the first refrigerant having passed through the first expansion valve, a second compressor configured to compress second refrigerant, a second condenser configured to condense the compressed second refrigerant, a second expansion valve configured to reduce a temperature and a pressure of the condensed second refrigerant, a second evaporator configured to evaporate the second refrigerant having passed through the second expansion valve, a first heat exchanger arranged after and connected to the first (Continued)

expansion valve, and a second heat exchanger arranged after and connected to the second expansion valve. The first heat exchanger and the second heat exchanger are configured to exchange heat with each other.

19 Claims, 5 Drawing Sheets

(51) Int. Cl.
*F25B 6/04* (2006.01)
*F25B 49/02* (2006.01)
*F25B 6/00* (2006.01)

(52) U.S. Cl.
CPC ............ *F25B 49/02* (2013.01); *F25B 49/022* (2013.01); *F25B 2600/112* (2013.01); *Y02B 30/743* (2013.01)

(56) References Cited

U.S. PATENT DOCUMENTS

| | | | | |
|---|---|---|---|---|
| 6,672,082 | B1* | 1/2004 | Maeda | F24F 3/1405 62/93 |
| 9,476,613 | B2* | 10/2016 | Tepas | F25B 5/02 |
| 9,500,395 | B2* | 11/2016 | Scheumann | F25B 6/02 |
| 2013/0133361 | A1* | 5/2013 | Yamashita | F25B 5/00 62/502 |
| 2013/0340469 | A1* | 12/2013 | Kim | F25B 5/00 62/498 |
| 2014/0116083 | A1* | 5/2014 | Chung | F25B 40/00 62/340 |

\* cited by examiner

[Fig. 1]
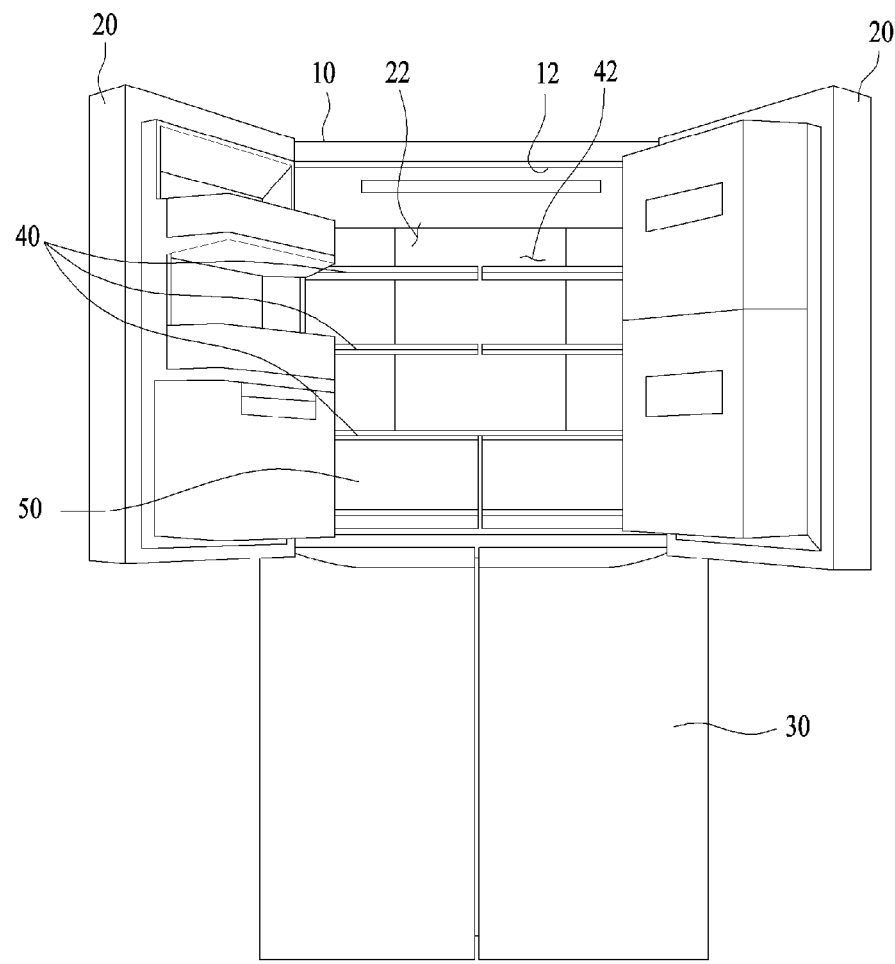

[Fig. 2]
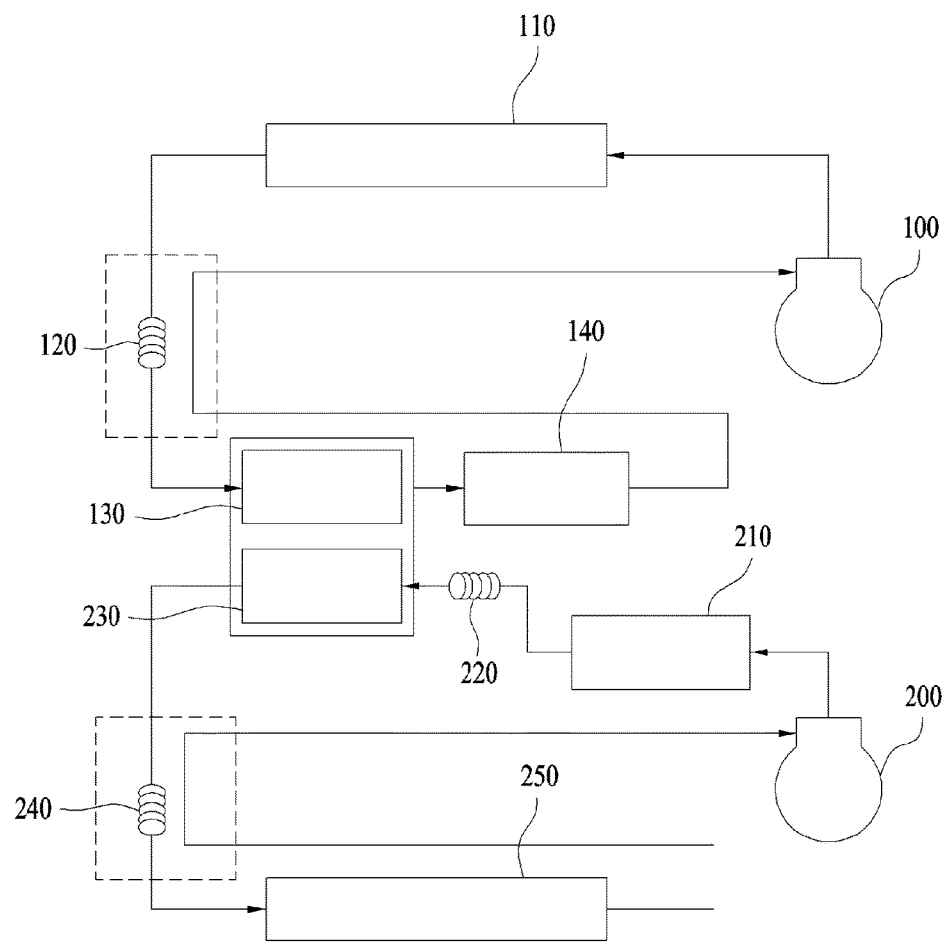

[Fig. 3]
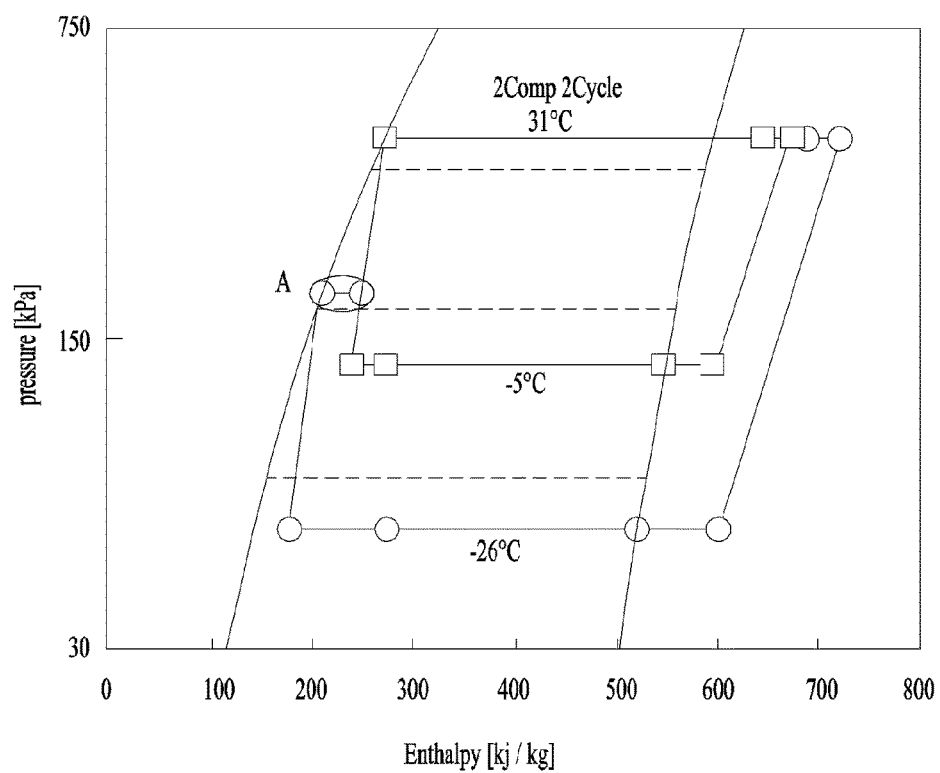

[Fig. 4]
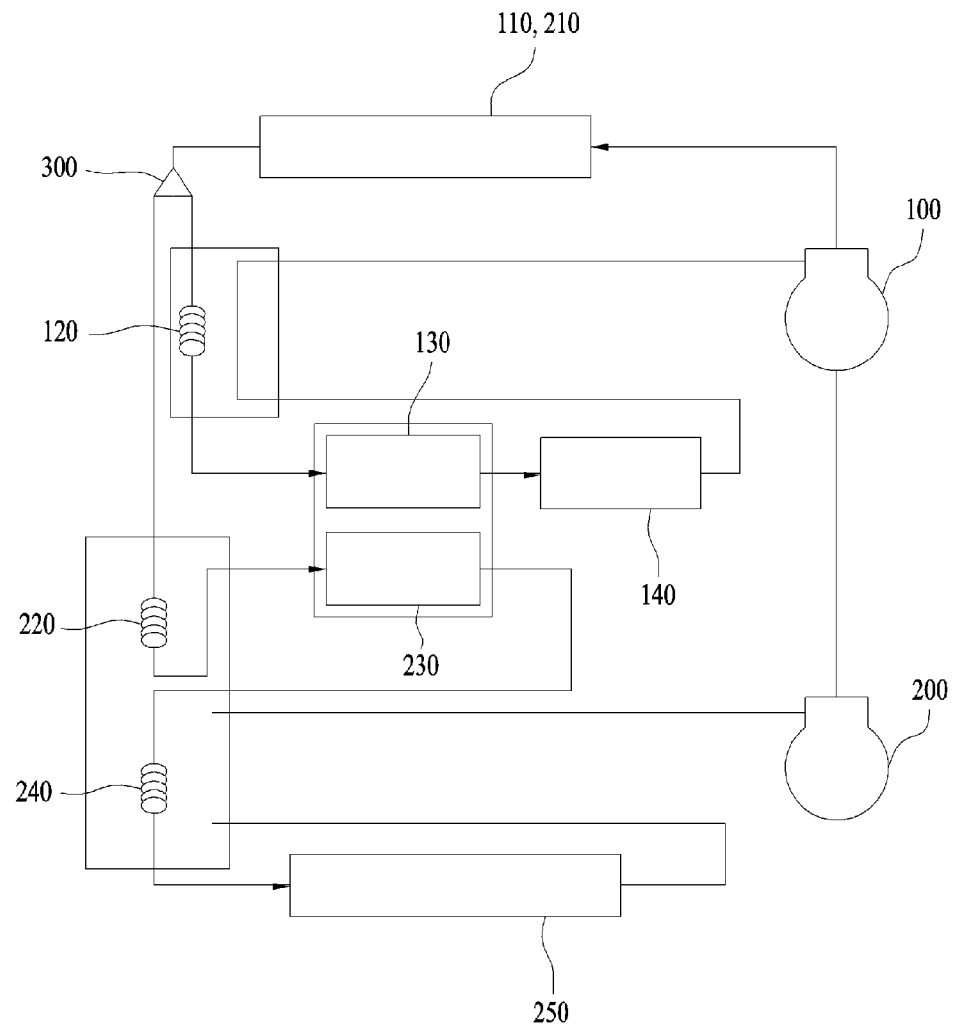

[Fig. 5]
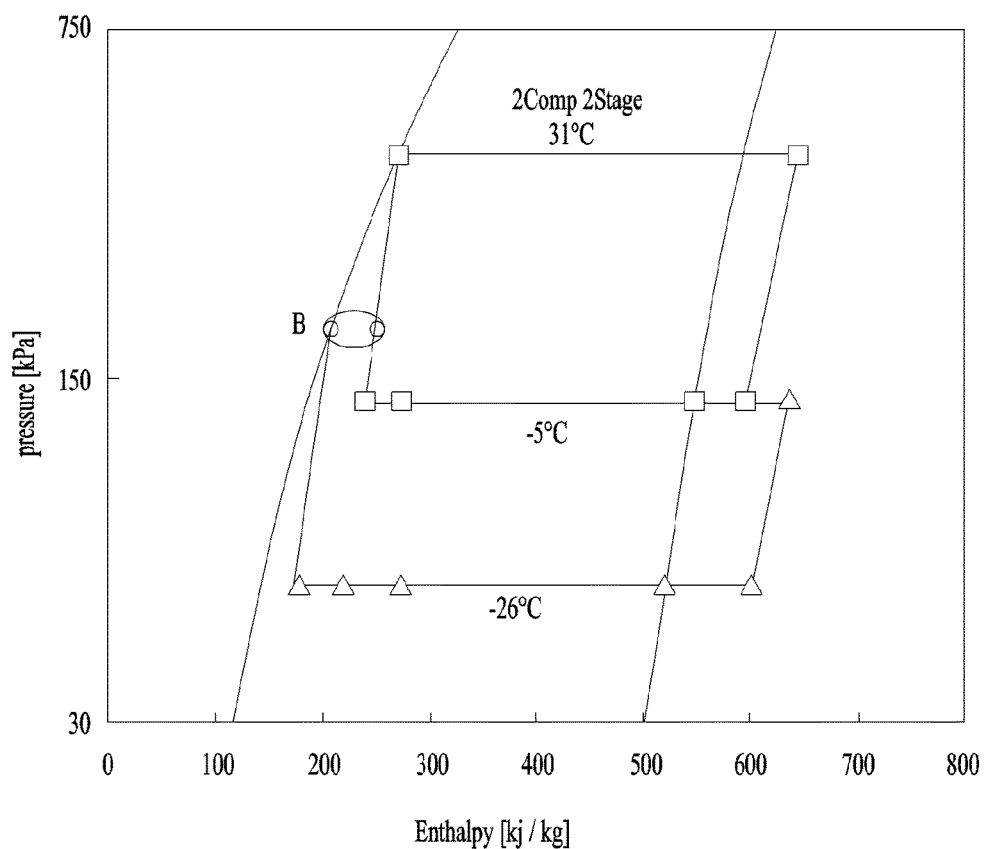

REFRIGERATOR

CROSS-REFERENCE TO RELATED APPLICATIONS

This application is a National Stage application under 35 U.S.C. § 371 of International Application No. PCT/KR2016/000638, filed Jan. 21, 2016, which claims priority under 35 U.S.C. 119(a) to Korean Application No. 10-2015-0011346, filed on Jan. 23, 2015. The disclosures of the prior applications are incorporated by reference in their entirety.

TECHNICAL FIELD

The present invention relates to a refrigerator and, more particularly, to a refrigerator having improved operation efficiency.

BACKGROUND ART

Generally, a refrigerator is used to keep, for example, food at freezing or less or at a temperature slightly above freezing. The refrigerator includes a case, which defines an accommodation space divided into a freezing compartment and a refrigerating compartment, and devices, which constitute a refrigeration cycle to lower temperatures inside the freezing compartment and the refrigerating compartment, such as, for example, a compressor, a condenser, an evaporator, and an expansion valve.

Doors are mounted to one side of the case and serve to open or close the freezing compartment and the refrigerating compartment respectively.

In the configuration of the refrigerator described above, the refrigeration cycle cools air in such a manner that low-temperature and low-pressure gas-phase refrigerant is compressed into high-temperature and high-pressure gas-phase refrigerant by the compressor, the compressed high-temperature and high-pressure gas-phase refrigerant is cooled and condensed into high-temperature liquid-phase refrigerant while passing through the condenser, and the high-pressure liquid-phase refrigerant is reduced in temperature and pressure while passing through the expansion valve, and subsequently draws heat from the surroundings so as to cool the surrounding air while changing into low-temperature and low-pressure gas-phase refrigerant in the evaporator.

Efforts to improve the efficiency of operation of the refrigeration cycle of the refrigerator in order to reduce power consumption are being continuously conducted.

DISCLOSURE OF INVENTION

Technical Problem

Therefore, the present invention has been made in view of the above problems, and it is an object of the present invention to provide a refrigerator having improved operation efficiency.

Solution to Problem

In accordance with one aspect of the present invention, the above and other objects can be accomplished by the provision of a refrigerator including a first compressor configured to compress refrigerant, a first condenser configured to condense the refrigerant compressed in the first compressor, a first expansion valve configured to reduce a temperature and pressure of the refrigerant condensed in the first condenser, a first evaporator configured to evaporate the refrigerant having passed through the first expansion valve, a second compressor configured to compress refrigerant, a second condenser configured to condense the refrigerant compressed in the second compressor, a second expansion valve configured to reduce a temperature and pressure of the refrigerant condensed in the second condenser, and a second evaporator configured to evaporate the refrigerant having passed through the second expansion valve, wherein the refrigerator further includes a first heat exchanger located at a rear of the first expansion valve and a second heat exchanger located at a rear of the second expansion valve, and the first heat exchanger and the second heat exchanger undergo heat exchange therebetween.

The first heat exchanger may absorb heat and the second heat exchanger may discharge heat.

The first heat exchanger may perform evaporation of the refrigerant, and the second heat exchanger may perform a reduction in the temperature of the refrigerant.

The refrigerant having passed through the first heat exchanger may be guided to the first evaporator, thereby being evaporated.

The refrigerator may further include a third expansion valve located at a rear of the second heat exchanger and at a front of the second evaporator.

The refrigerant having passed through the second heat exchanger may be guided to the third expansion valve, thereby being reduced in temperature and pressure.

The refrigerant compressed by the first compressor may be different from the refrigerant compressed by the second compressor.

The first compressor may be a refrigerating compartment compressor configured to compress refrigerant in order to supply cold air into a refrigerating compartment, and the second compressor may be a freezing compartment compressor configured to compress refrigerant in order to supply cold air into a freezing compartment.

The first compressor and the second compressor may compress the refrigerant so that the same pressure is applied to the refrigerant.

The first condenser and the second condenser may condense the refrigerant at the same pressure.

The refrigerant compressed by the second compressor may be additionally compressed by the first compressor.

The first condenser and the second condenser may be the same single member.

A valve may be installed at a rear of the first condenser and may serve to apportion the refrigerant between the first expansion valve and the second expansion valve.

The refrigerant having passed through the first evaporator may be guided to the first compressor, and the refrigerant having passed through the second evaporator may be guided to the second compressor.

The second compressor may compress the refrigerant to a higher pressure than the first compressor.

Advantageous Effects of Invention

According to the present invention, the efficiency of operation of a refrigerator may be improved, which may reduce the power to be consumed for the operation of a refrigeration cycle.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a front view illustrating the open state of doors provided in a refrigerator in accordance with an embodiment of the present invention;

FIG. 2 is a view illustrating the configuration of major components in accordance with one embodiment of the present invention;

FIG. 3 is a P-h diagram of FIG. 2;

FIG. 4 is a view illustrating the configuration of major components in accordance with another embodiment of the present invention; and FIG. 5 is a P-h diagram of FIG. 4.

BEST MODE FOR CARRYING OUT THE INVENTION

Hereinafter, exemplary embodiments of the present invention will be described in detail with reference to the accompanying drawings in order to concretely realize the objects as set forth above.

In the drawings, the sizes or shapes of components may be exaggerated to emphasize more clearly the explanation in the drawings and for convenience. In addition, the terms, which are specially defined in consideration of the configuration and operations of the present invention, may be replaced by other terms based on intentions of users and operators or customs. The meanings of these terms should be construed based on the whole content of this specification.

FIG. 1 is a front view illustrating the open state of doors provided in a refrigerator in accordance with an embodiment of the present invention.

The refrigerator in accordance with the embodiment may be equally applied to a top mount type refrigerator in which a storage compartment to store food therein is divided into an upper freezing compartment and a lower refrigerating compartment, and a side by side type refrigerator in which a freezing compartment and a refrigerating compartment are arranged on the left and right sides.

The present embodiment, for convenience of description, will be described below based on a bottom freezer type refrigerator in which a storage compartment is divided into an upper refrigerating compartment and a lower freezing compartment located below the refrigerating compartment.

A cabinet of the refrigerator is comprised of an outer case 10, which defines the overall external appearance of the refrigerator when viewed by a user from the outside, and an inner case 12, which internally defines a storage compartment 22 in which food is stored. A prescribed space may be defined between the outer case 10 and the inner case 12 and may serve as, for example, a passage for the circulation of cold air. Meanwhile, an insulation material may be interposed between the outer case 10 and the inner case 12 to allow the inside of the storage compartment 22 to be kept at a lower temperature than the outside.

In addition, a refrigerant cycle device is installed in a machine room (not illustrated), which is defined in the space between the outer case 10 and the inner case 12. The refrigerant cycle device serves to generate cold air by circulating refrigerant. Food stored in the refrigerator may be kept fresh as the inside of the refrigerator is kept at a low temperature through the use of the refrigerant cycle device. The refrigerant cycle device includes, for example, a compressor to compress refrigerant, and an evaporator (not illustrated), which changes liquid-phase refrigerant into gas-phase refrigerant so as to cause heat exchange between the refrigerant and the outside.

The refrigerator includes doors 20 and 30, which open or close the storage compartment 22. At this time, the doors may include a freezing compartment door 30 and a refrigerating compartment door 20, and each door may be pivotably installed to the cabinet of the refrigerator via hinges. A plurality of freezing compartment doors 30 and a plurality of refrigerating compartment doors 20 may be provided. That is, as exemplarily illustrated in FIG. 1, the refrigerating compartment doors 20 and the freezing compartment doors 30 may be installed so as to be pivotably opened forward about opposite edges of the refrigerator.

The space between the outer case 10 and the inner case 12 may be filled with a foam material, in order to realize thermal insulation between the outside and the storage compartment 22.

The storage compartment 22 defines a space that is thermally insulated from the outside by the inner case 12 and the door 20. When the door 20 closes the storage compartment 22, the storage compartment 22 may define a space that is isolated and thermally insulated from the outside. In other words, the storage compartment 22 may be a space that is isolated from the outside by a thermal insulation wall provided by the door 20 and a thermal insulation wall provided by the cases 10 and 12.

Within the storage compartment 22, cold air supplied from the machine room may flow everywhere so as to keep the food stored in the storage compartment 22 at a low temperature.

A shelf 40, on which food is placed, may be provided in the storage compartment 22. Here, a plurality of shelves 40 may be provided, and food may be placed on the respective shelves 40. The shelves 40 may horizontally divide the storage compartment 22.

A drawer 50 is installed in the storage compartment 22 so as to be pulled outward or pushed into the storage compartment 22. The drawer 50 is configured to accommodate and store, for example, food therein. Two drawers 50 may be respectively arranged on the left and right sides within the storage compartment 22. When attempting to access the left drawer, a user may open the door on the left side of the storage compartment 22. On the other hand, when attempting to access the right drawer, the user may open the door on the right side of the storage compartment 22.

The inside of the storage compartment 22 may be divided into a plurality of food storage spaces including, for example, the space above the shelf 40 and the space inside the drawer 50.

Although cold air supplied to one storage compartment is not permitted to freely move to another storage compartment, the cold air supplied to one storage compartment may freely move to respective spaces defined within that storage compartment. That is, cold air present above the shelf 40 may move to the space defined inside the drawer 50.

FIG. 2 is a view illustrating the configuration of major components in accordance with one embodiment of the present invention, and FIG. 3 is a P-h diagram of FIG. 2.

Referring to FIGS. 2 and 3, the refrigerator in accordance with one embodiment includes a first compressor 100 to compress refrigerant, a first condenser 110 to condense the refrigerant compressed in the first compressor 100, a first expansion valve 120 to reduce the temperature and pressure of the refrigerant condensed in the first condenser 110, and a first evaporator 140 to evaporate the refrigerant having passed through the first expansion valve 120.

In addition, in the embodiment, the refrigerator further includes a second compressor 200 to compress refrigerant, a second condenser 210 to condense the refrigerant compressed in the second compressor 200, a second expansion valve 220 to reduce the temperature and pressure of the refrigerant condensed in the second condenser 210, and a second evaporator 250 to evaporate the refrigerant having passed through the second expansion valve 220.

In the embodiment, the refrigerator has an overall configuration in which two refrigeration cycles are individually driven.

In particular, in the embodiment, the refrigerator includes a first heat exchanger 130 located at the rear of the first expansion valve 120 and a second heat exchanger 230 located at the rear of the second expansion valve 220. That is, the refrigerant having passed through the first expansion valve 120 is guided to the first heat exchanger 130, and the refrigerant having passed through the second expansion valve 220 is guided to the second heat exchanger 230.

At this time, the first heat exchanger 130 and the second heat exchanger 230 may be arranged close to each other so as to enable the exchange of heat therebetween. The first heat exchanger 130 may serve to absorb heat, and the second heat exchanger 230 may serve to discharge heat.

That is, the first heat exchanger 130 may function to evaporate the refrigerant, and the second heat exchanger 230 may function to reduce the temperature of the refrigerant. The refrigerant having passed through the first heat exchanger 130 may be guided to and evaporated in the first evaporator 140.

Meanwhile, the refrigerator may include a third expansion valve 240, which is located at the rear of the second heat exchanger 230, i.e. at the front of the second evaporator 250. The refrigerant having passed through the second heat exchanger 230 may be guided to the third expansion valve 240 so as to be reduced in temperature and pressure.

In the embodiment, the refrigerant that is compressed by the first compressor 100 may be different from the refrigerant that is compressed by the second compressor 200. That is, the refrigerant compressed by the first compressor 100 does not pass through the second compressor 200. In other words, the refrigeration cycle implemented by the first compressor 100 and the refrigeration cycle implemented by the second compressor 200 may be independent of each other, and the refrigerant passing through the first compressor 100 and the refrigerant passing through the second compressor 200 are not mixed with each other.

Here, the first compressor 100 may be a refrigerating compartment compressor that compresses refrigerant in order to supply cold air into the refrigerating compartment, and the second compressor 200 may be a freezing compartment compressor that compresses refrigerant in order to supply cold air into the freezing compartment.

In addition, the first compressor 100 and the second compressor 200 may compress the refrigerant so that the same pressure is applied to the refrigerant. Of course, the first condenser 110 and the second condenser 210 may condense the refrigerant at the same pressure.

Hereinafter, the flow of the refrigerant will be described with reference to FIGS. 2 and 3.

First, the refrigerant is compressed by the first compressor 100. The refrigerant may be condensed while passing through the first condenser 110.

Subsequently, after passing through the first expansion valve 120, the refrigerant is guided to the first heat exchanger 130. At this time, the first heat exchanger 130 may function similar to an evaporator so that the refrigerant is evaporated in the first heat exchanger 130.

Subsequently, the refrigerant may perform heat exchange with air outside the first evaporator 140 while passing through the first evaporator 140, so as to supply cold air into the corresponding storage compartment.

The refrigerant having passed through the first evaporator 140 may be guided to the first compressor 100 so as to be compressed by the first compressor 100.

On the other hand, the refrigerant, compressed by the second compressor 200, is guided to the second condenser 210. The refrigerant having passed through the second condenser 210 is guided to the second expansion valve 220 and losses heat to the outside in the second heat exchanger 230. Thereby, the refrigerant may be condensed or cooled while passing through the second heat exchanger 230. This additional condensation corresponds to section "A" in FIG. 3. With this section "A", the load of the refrigeration cycle including the second compressor 200 may be moved to the refrigeration cycle including the first compressor 100, which may improve the efficiency of operation of the refrigerator.

That is, the refrigerant compressed by the second compressor 200 may ultimately discharge a greater amount of cold air from the second evaporator 250 thanks to the inclusion of the additional condensation section "A".

The refrigerant having passed through the second heat exchanger 230 passes through the third expansion valve 240, and thereafter is guided to the second evaporator 250. At this time, the second evaporator 250 may perform heat exchange with air inside the storage compartment so as to supply cold air into the storage compartment.

The refrigerant having passed through the second evaporator 250 may be guided to the second compressor 200 so as to be compressed by the second compressor 200.

As was verified by experiments performed under the conditions of the embodiment, the overall efficiency of operation of the refrigerator is improved by 3.9%, compared to the case where the first heat exchanger 130 and second heat exchanger 230 are not used (under the assumption that the other conditions are the same).

FIG. 4 is a view illustrating the configuration of major components in accordance with another embodiment of the present invention, and FIG. 5 is a P-h diagram of FIG. 4.

Referring to FIGS. 4 and 5, the refrigerator in accordance with another embodiment includes the first compressor 100 to compress refrigerant, the first condenser 110 to condense the refrigerant compressed in the first compressor 100, the first expansion valve 120 to reduce the temperature and pressure of the refrigerant condensed in the first condenser 110, and the first evaporator 140 to evaporate the refrigerant having passed through the first expansion valve 120.

In addition, in the present embodiment, the refrigerator further includes the second compressor 200 to compress refrigerant, the second condenser 210 to condense the refrigerant compressed in the second compressor 200, the second expansion valve 220 to reduce the temperature and pressure of the refrigerant condensed in the second condenser 210, and the second evaporator 250 to evaporate the refrigerant having passed through the second expansion valve 220. In the present embodiment, the first condenser 110 and the second condenser 210 are the same single member. Thus, in the present embodiment, the terms "first condenser" and "second condenser" mean the same thing.

In particular, in the present embodiment, the refrigerator includes the first heat exchanger 130 located at the rear of the first expansion valve 120 and the second heat exchanger 230 located at the rear of the second expansion valve 220.

That is, the refrigerant having passed through the first expansion valve 120 is guided to the first heat exchanger 130, and the refrigerant having passed through the second expansion valve 220 is guided to the second heat exchanger 230.

At this time, the first heat exchanger 130 and the second heat exchanger 230 may be arranged close to each other so as to enable the exchange of heat therebetween. The first heat exchanger 130 may serve to absorb heat, and the second heat exchanger 230 may serve to discharge heat.

That is, the first heat exchanger 130 may function to evaporate the refrigerant, and the second heat exchanger 230 may function to reduce the temperature of the refrigerant. The refrigerant having passed through the first heat exchanger 130 may be guided to and evaporated in the first evaporator 140.

Meanwhile, the refrigerator may include the third expansion valve 240, which is located at the rear of the second heat exchanger 230, i.e. at the front of the second evaporator 250. The refrigerant having passed through the second heat exchanger 230 may be guided to the third expansion valve 240 so as to be reduced in temperature and pressure.

In the present embodiment, the refrigerant, which is compressed by the second compressor 200, may be additionally compressed by the first compressor 100. That is, the refrigerant undergoes multi-stage compression in such a manner that the refrigerant is compressed to a relatively low pressure in the second compressor 200, and thereafter is compressed to a relatively high pressure in the first compressor 100. The second compressor 200 may compress the refrigerant to a higher pressure than the first compressor 100.

A valve 300 may be installed at the rear of the first condenser 110, and may serve to apportion the refrigerant between the first expansion valve 120 and the second expansion valve 220. That is, the refrigerant having passed through the first condenser 110 is guided, while passing through the valve 300, such that some is guided to the first expansion valve 120 and the remainder is guided to the second expansion valve 220.

That is, the valve 300 may provide paths, along which the refrigerant having passed through the first condenser 110, is divided to move to the first expansion valve 120 and the second expansion valve 220.

The movement of the refrigerant in accordance with the present embodiment will now be described with reference to FIGS. 4 and 5.

The refrigerant, compressed by the second compressor 200, is additionally compressed while passing through the first compressor 100. The refrigerant, which has been compressed to a low pressure by the second compressor 200, may be compressed to a high pressure by the first compressor 100.

The refrigerant, compressed by the first compressor 100, may be condensed while passing through the first condenser 110.

The refrigerant having passed through the first condenser 110 is divided in the valve 300 such that some of the refrigerant passes through the first expansion valve 120 to thereby be guided to the first heat exchanger 130. In the first heat exchanger 130, some of the refrigerant is evaporated and absorbs heat from the outside. Then, the refrigerant is additionally evaporated while passing through the first evaporator 140, thereby serving to supply cold air to the refrigerating compartment.

The refrigerant having passed through the first evaporator 140 may be guided to the first compressor 100 so as to be compressed by the first compressor 100.

The refrigerant having passed through the first condenser 110 may be divided in the valve 300 such that some of the refrigerant passes through the second expansion valve 220 to thereby be guided to the second heat exchanger 230. Since the second heat exchanger 230 undergoes heat exchange with the first heat exchanger 130, in the second heat exchanger 230, the refrigerant may be condensed by discharging heat. That is, as exemplarily illustrated in FIG. 5, while passing through the second heat exchanger 230, the refrigerant may be additionally condensed while passing the section "B".

As the refrigerant passes the section "B", the load during the implementation of cooling may be moved, which may improve the efficiency of operation of the refrigerator.

The refrigerant having passed through the second heat exchanger 230 passes through the third expansion valve 240, and thereafter is guided to the second evaporator 250, which serves to supply cold air to the freezing compartment. The refrigerant is evaporated in the second evaporator 250 and undergoes heat exchange with air inside the freezing compartment, thereby supplying cold air to the freezing compartment.

As was verified by experiments performed under the conditions of the present embodiment, the overall efficiency of operation of the refrigerator is improved by 3.7%, compared to the case where the first heat exchanger 130 and the second heat exchanger 230 are not used (under the assumption that the other conditions are the same).

The present invention is not limited to the embodiments described above, various other alterations of the embodiments are possible by those skilled in the part as can be appreciated from the accompanying claims, and these alterations fall within the scope of the present invention.

Mode for the Invention

As described above, a related description has sufficiently been discussed in the above "Best Mode" for implementation of the present invention.

INDUSTRIAL APPLICABILITY

As described above, the present invention may be wholly or partially applied to a refrigerator.

The invention claimed is:

1. A refrigerator comprising:
a first compressor configured to compress first refrigerant;
a first condenser configured to condense the first refrigerant compressed by the first compressor;
a first expansion valve configured to reduce a temperature and a pressure of the first refrigerant condensed by the first condenser;
a first evaporator configured to evaporate the first refrigerant having passed through the first expansion valve;
a second compressor configured to compress second refrigerant;
a second condenser configured to condense the second refrigerant compressed by the second compressor;
a second expansion valve configured to reduce a temperature and a pressure of the second refrigerant condensed by the second condenser;
a second evaporator configured to evaporate the second refrigerant having passed through the second expansion valve;
a first heat exchanger arranged after and connected to the first expansion valve; and
a second heat exchanger arranged after and connected to the second expansion valve, wherein the first heat exchanger and the second heat exchanger are configured to exchange heat with each other, wherein the first heat exchanger is configured to evaporate the first refrigerant, and wherein the second heat exchanger is configured to reduce the temperature of the second refrigerant based on the first heat exchanger evaporating the first refrigerant.

2. The refrigerator according to claim 1, wherein the first heat exchanger is configured to absorb heat from the second heat exchanger.

3. The refrigerator according to claim 1, wherein the first evaporator is configured to receive the first refrigerant that has passed through the first heat exchanger and been guided to the first evaporator.

4. The refrigerator according to claim 1, further comprising a third expansion valve arranged after the second heat exchanger and before the second evaporator.

5. The refrigerator according to claim 4, wherein the third expansion valve is configured to receive the second refrigerant that has passed through the second heat exchanger and been guided to the third expansion valve, and wherein the third expansion valve is configured to reduce the temperature and the pressure of the second refrigerant.

6. The refrigerator according to claim 1, wherein the first refrigerant compressed by the first compressor is different from the second refrigerant compressed by the second compressor.

7. The refrigerator according to claim 6, wherein the first compressor is a refrigerating compartment compressor configured to compress the first refrigerant and to supply cold air into a refrigerating compartment, and wherein the second compressor is a freezing compartment compressor configured to compress the second refrigerant and to supply cold air into a freezing compartment.

8. The refrigerator according to claim 6, wherein the first compressor is configured to compress the first refrigerant to a predetermined pressure, and wherein the second compressor is configured to compress the second refrigerant to the predetermined pressure.

9. The refrigerator according to claim 6, wherein the first condenser is configured to condense the first refrigerant to a preset pressure, and wherein the second condenser is configured to condense the second refrigerant to the preset pressure.

10. The refrigerator according to claim 1, wherein the first and second compressors are connected to each other, and wherein the first compressor is configured to receive the second refrigerant compressed by the second compressor and to additionally compress the received second refrigerant.

11. The refrigerator according to claim 10, wherein the first condenser and the second condenser are a single condenser.

12. The refrigerator according to claim 11, wherein a valve is arranged after the single condenser and configured to divide refrigerant into the first expansion valve and the second expansion valve.

13. The refrigerator according to claim 11, wherein the first compressor is configured to receive the first refrigerant that has passed through the first evaporator and been guided to the first compressor, and wherein the second compressor is configured to receive the second refrigerant that has passed through the second evaporator and been guided to the second compressor.

14. The refrigerator according to claim 10, wherein the second compressor is configured to compress the second refrigerant to a higher pressure than the first compressor.

15. A refrigerator comprising:

a first compressor configured to receive refrigerant and to compress the refrigerant;

a second compressor connected to the first compressor and configured to compress the refrigerant and supply the refrigerant to the first compressor;

a condenser configured to condense the refrigerant compressed by the first compressor;

a valve arranged after the condenser and configured to divide the refrigerant into first refrigerant and second refrigerant;

a first expansion valve configured to receive the first refrigerant from the valve and to reduce a temperature and a pressure of the first refrigerant;

a first evaporator configured to evaporate the first refrigerant having passed through the first expansion valve;

a second expansion valve configured to receive the second refrigerant and to reduce a temperature and a pressure of the second refrigerant;

a second evaporator configured to evaporate the second refrigerant having passed through the second expansion valve;

a first heat exchanger arranged after and connected to the first expansion valve;

a second heat exchanger arranged after and connected to the second expansion valve; and a third expansion valve arranged after the second heat exchanger and before the second evaporator, wherein the first heat exchanger and the second heat exchanger are configured to exchange heat with each other.

16. The refrigerator according to claim 15, wherein the first compressor is configured to receive the first refrigerant from the first heat exchanger and the second refrigerant from the second compressor.

17. The refrigerator according to claim 15, wherein the first heat exchanger is configured to absorb heat from the second heat exchanger.

18. The refrigerator according to claim 15, wherein the first heat exchanger is configured to evaporate the first refrigerant, and wherein the second heat exchanger is configured to reduce the temperature of the second refrigerant based on the first heat exchanger evaporating the first refrigerant.

19. The refrigerator according to claim 15, wherein the third expansion valve is configured to receive the second refrigerant from the second heat exchanger and to reduce the temperature and the pressure of the second refrigerant.

* * * * *